May 22, 1945.  A. E. W. JOHNSON ET AL  2,376,541
MOUNTING FOR IMPLEMENT LIFTS
Filed June 10, 1943  3 Sheets-Sheet 1
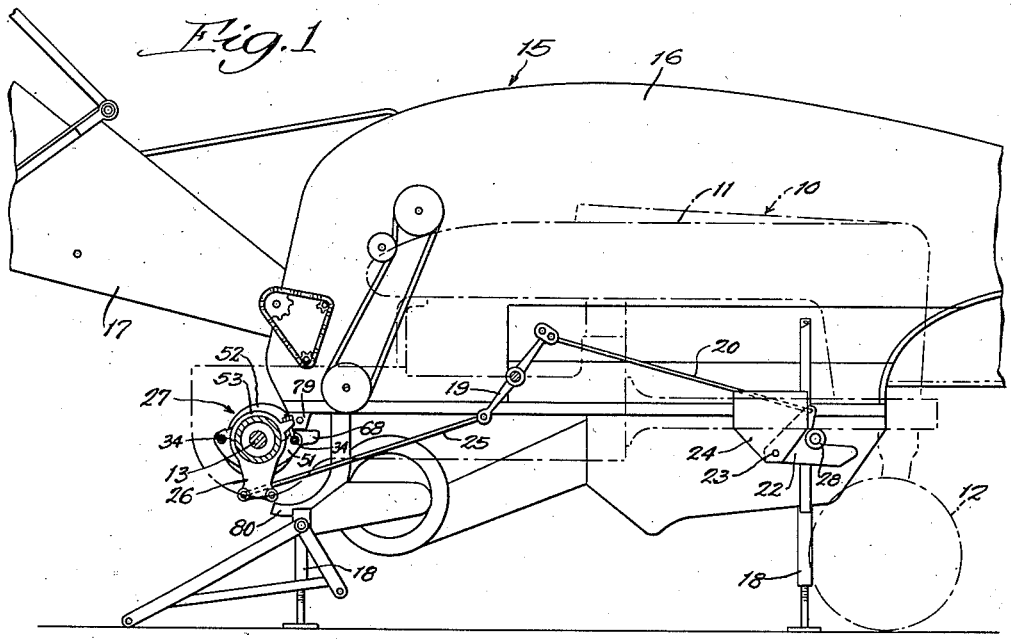
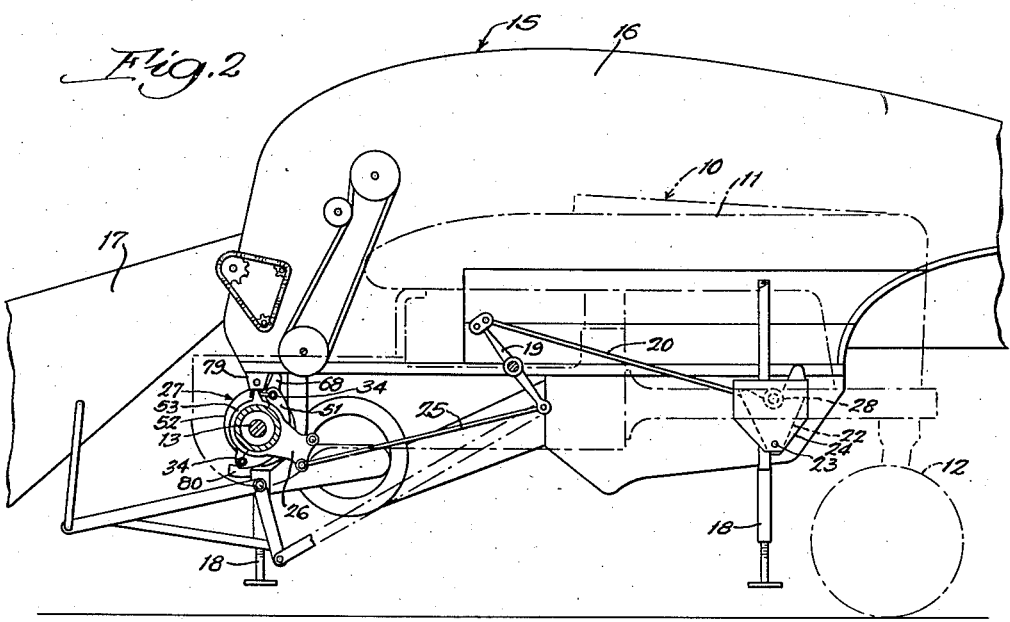

May 22, 1945.  A. E. W. JOHNSON ET AL  2,376,541
MOUNTING FOR IMPLEMENT LIFTS
Filed June 10, 1943  3 Sheets-Sheet 2

Inventors:
Arnold E. W. Johnson
and Rex B. Hitchcock,
By Paul O. Pippel
Attorney.

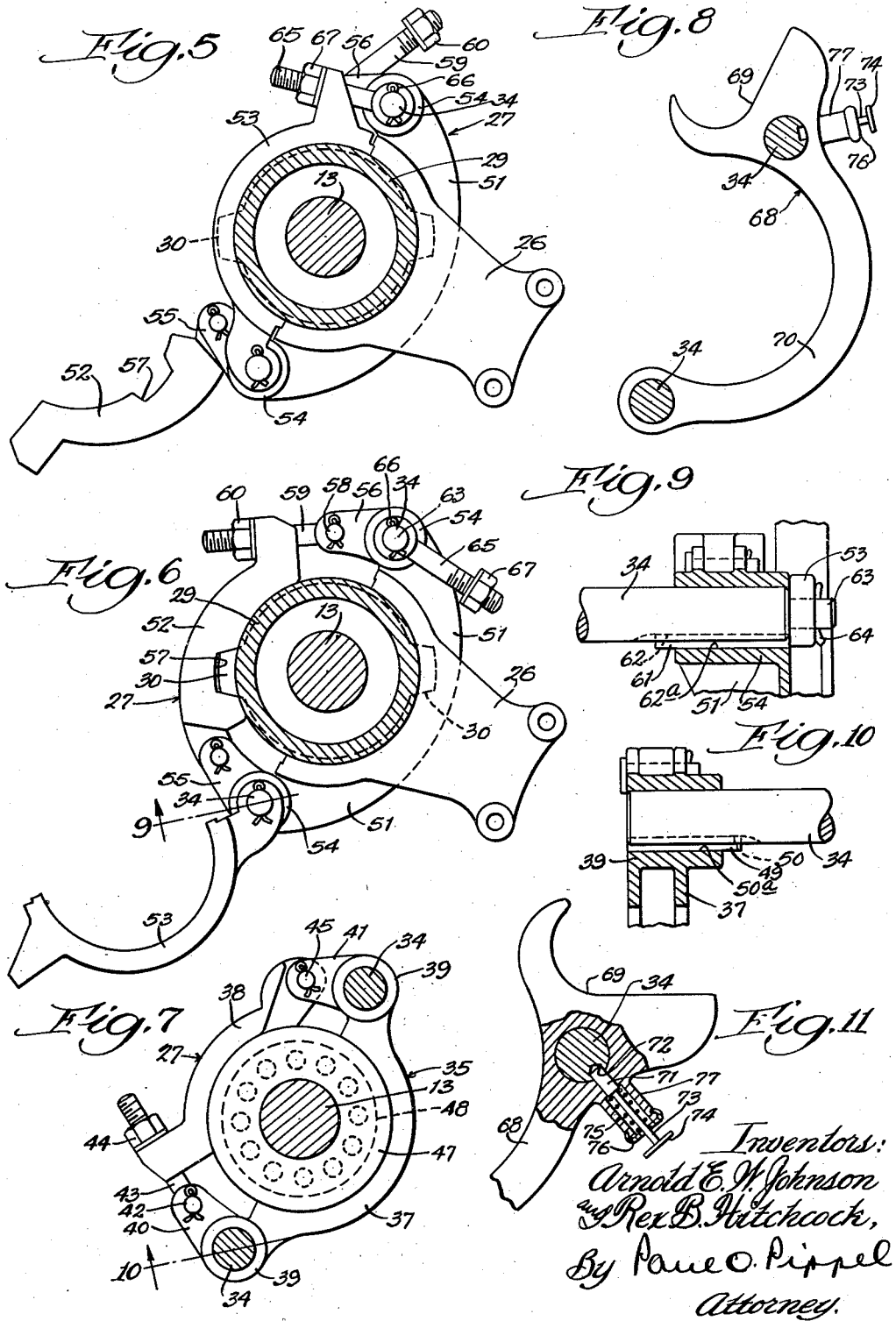

Patented May 22, 1945

2,376,541

UNITED STATES PATENT OFFICE 2,376,541

MOUNTING FOR IMPLEMENT LIFTS

Arnold E. W. Johnson, Oak Park, and Rex B. Hitchcock, Evanston, Ill., assignors to International Harvester Company, a corporation of New Jersey Application June 10, 1943, Serial No. 490,268

31 Claims. (Cl. 56—10)

This invention relates to a mounting for an implement lift. More specifically it relates to a mounting for an implement lift to be carried by the axle of a tractor.

In the copending application of Hitchcock et al. Serial No. 490,267, filed June 10, 1943, there is disclosed an arrangement for lifting an implement onto a tractor, which arrangement includes lifting members and a sleeve carrying the lifting members and surrounding the rear axle of a tractor. For operation of the lifting arrangement, the sleeve is rotated through a small angle about the tractor axle to shift the lifting members. The present application has to do with an improved mounting for these lifting members upon the tractor axle and involves a special form of structure substituted for the sleeve surrounding the axle.

An object of the present invention is to provide an improved mounting for lifting means.

A further object is the provision of an improved mounting for lifting means upon an axle of a mobile supporting frame.

A further object is to provide an improved mounting for an implement lifting means upon a tractor axle.

Other objects will appear from the disclosure.

According to the present invention, a mounting structure, comprising a pair of rods positioned upon opposite sides of a tractor axle and ring-like structures supporting the rods at their ends, carries lifting members by which an implement is raised to mounted position upon a tractor. For raising the implement to mounted position upon the tractor, the mounting structure is moved angularly about the tractor axle to shift the lifting members and thereby to effect the lifting of the implement.

In the drawings:

Figure 1 is a side view with parts removed showing a harvester thresher and a tractor immediately adjacent the harvester thresher;

Figure 2 is a similar side view showing the harvester thresher lifted to mounted position upon the tractor;

Figure 3 is an end view showing the tractor axle, the novel lifting structure of the present invention, and a portion of the harvester thresher engaged by the lifting structure;

Fig. 4 is a similar view with the portion of the harvester thresher omitted and parts of the lifting structure opened up;

Figure 5 is a sectional view taken on the line 5 of Figure 3;

Figure 6 is a sectional view taken on the line 6 of Figure 3;

Figure 7 is a sectional view taken on the line 7 of Figure 3;

Figure 8 is a sectional view taken on the line 8 of Figure 3;

Figure 9 is a sectional view taken on the line 9 of Figure 6;

Figure 10 is a sectional view taken on the line 10 of Figure 7; and

Figure 11 is a detail view, partially in section, showing the structure of Figure 8 in a different position.

The reference character 10 designates a tractor having a narrow, longitudinally extending body 11, a narrow front rolling support 12, an extended left-hand axle 13, and wheel 14 connected thereto in spaced relation to the body 11 and determining a wheel line spaced from the body. As shown in Figure 1, the tractor 10 is positioned immediately adjacent a harvester thresher 15 comprising a thresher part 16 and a harvester part 17. The harvester thresher 15 is supported upon adjustable feet 18. Figure 2 shows the harvester thresher 15 raised to mounted position upon the tractor, and this is accomplished through actuation of a power member 19 located at the side of the tractor body 11 and connected with the usual tractor power plant, not shown. One end of the power member 19 is connected by a link 20 with a lifting member 22 pivoted at 23 on a bracket 24 secured to the side of the tractor body 11. The other end of the power member 19 is connected by a link 25 with a depending flange 26 connected with a lifting structure 27 mounted upon the rear axle 13 and to be described in detail presently. Actuation of the power member 19 causes an angular movement of this member, bringing about an angular movement of the lifting member 22 engaging a roller 28 connected to the thresher body 16 and thereby raising the rear end of the thresher part 16. Similarly, an angular movement of the lifting structure 27 with respect to the rear axle 13 causes a lifting of the front end of the thresher part 16 and the harvester part 17. In the aforementioned copending application of Hitchcock et al., the lifting structure 27 comprises essentially a sleeve surrounding the tractor axle and lifting member secured to the sleeve. The lifting structure has been described and claimed both broadly and specifically in the Hitchcock et al. application, and it is the purpose of the present application to set forth an alternate structure as a substitute for the sleeve and the lifting members secured thereto.

As seen in Figure 3, the axle 13 projects from a housing 29 having longitudinal flanges 30. The axle 13 is of unusual length and is composed of an exposed portion 31, an exposed extension 32, and a sleeve 33 joining the portion 31 and the extension 32. Thus, the wheel 14 is spaced far enough from the tractor body 11 to permit the placing of the thresher body 16 between the tractor body 11 and the wheel line determined by the tractor wheel 14. The lifting structure 27 previously referred to comprises essentially a pair of rods 34 positioned on opposite sides of the tractor axle 13 and ring-like structures 35 and 36 carrying the ends of the rods 34 and maintaining their placing on opposite sides of the tractor axle 13. The ring-like structure 35 comprises a lower half 37 and an upper half 38. The lower half 37 has bosses 39 pierced by the rods 34 and projections 40 and 41 extending from the bosses 39. The projections 40 support a pin 42 serving as a pivot for a clamping bolt 43 cooperating with a nut 44 thereon to hold the upper half 38 of the ring-like structure 35 in the position shown in Figure 7. One end of the upper half 38 is pivoted to the projections 41 by a pin 45. The bolt 43 and nut 44 cause the halves 37 and 38 of the ring-like structure 35 to be clamped about an annulus 47 embracing a roller bearing 48 mounted upon the exposed extension 32 of the axle 13. As seen in Figure 10, the lower half 37 of the ring-like structure 35 is secured against movement along one rod 34 by a key 49 driven into a keyway 50 in the one rod 34 and a keyway 50a in the one boss 39 of the half 37. In a similar way, the lower half 37 is held against movement along the other rod 34.

The ring-like structure 36 is formed of a lower half 51 and upper halves 52 and 53. The lower half 51 has integrally formed therewith the depending flange 26 by which angular movement of the lifting structure 27 is effected through actuation of the power member 19. The lower half 51 has bosses 54 pierced by the rods 34 and projections 55 and 56. A pin 57 passes through the projections 55 and serves as a pivotal connection for the half 52 with the projections 55. The half 52 has an internal groove 57 engageable with one flange 30 on the axle housing 29, as shown in Figure 6, to prevent angular movement of the lifting structure 27 with respect to the axle 13 and thereby to maintain the harvester thresher 15 in lifted position. A pin 58 passes through the projections 56 and a clamping bolt 59, serving pivotally to connect the bolt 59 to the projections 56. A nut 60 on the bolt 59 cooperates with the bolt to hold the upper half 52 in the position shown in Figure 6 with the groove 57 engaging one flange 30 on the axle housing 29. As shown in Figure 9, the lower half 51 of the ring-like structure 36 is secured against movement along one rod 34 by a key 61 driven into a keyway 62 in the one rod 34 and into a keyway 62a in the one boss 54 in the lower half 51. The lower half 51 is secured against movement along the other rod 34 in a similar way. The rods 34 have reduced ends 63. The half 53 is pivotally mounted on the reduced ends 63 and is held against the lower half 51 by a cotter pin 64. A clamping bolt 65 is pivoted on the reduced end 63 of the other rod 34 and is held thereon by a cotter pin 66. As shown in Figure 5, a nut 67 on the bolt 65 cooperates with the bolt to clamp the lower half 51 and the upper half 52 of the ring-like structure 36 against the axle housing 29.

Figure 8 shows one of a pair of lifting members 68 mounted upon the rods 34 so as to be pierced thereby. Each lifting member 68 includes an implement-engaging portion 69 in the form of a hook and a connecting portion 70 extending between the rods 34, so that both rods support each lifting member 68. As seen in Figure 11, each lifting members 68 carries a plunger 71 insertable into openings 72 disposed conveniently along the length of one rod 34. The plunger 71 has a reduced stem 73 and an enlarged head 74 serving as a handle. The stem 73 is surrounded by a spring 75 acting at one end against the plunger 71 and at the other end against a cap 76 pressed onto a portion 77 of the lifting member 68 through which the spring 75 and stem 73 project. The one rod 34 may carry quite a number of openings 72 in which the plunger 71 associated with the lifting member 68 may be inserted. The insertion of a plunger 71 in a certain hole 72 in the one rod 34 fixes the position of the lifting member 68 along the rod 34. Thus, the lifting members 68 may be secured at various positions along the rods 34 with different spacings from one another to accommodate devices of various widths mounted upon the tractor. As seen in Figure 3, the lifting members 68 engage rollers 78 mounted in brackets 79 secured to the under front side of the thresher part 16.

Raising of the harvester thresher 15 from the detached ground-engaging position of Figure 1 to the tractor-mounted position of Figure 2 has been previously referred to. As stated, the angular movement of the power member 19 causes angular movement of the lifting member 22 and of the lifting structure 27, or, more particularly, of the lifting members 68. The lifting members 68 will shift from a position as shown in Figure 11 to the position of Figure 8, and will hold the roller 78 mounted upon the under side of the thresher part 16 directly over the axle 13. The thresher part 16 has a depending projecting portion 80 near the brackets 79 and rollers 78, which portion extends downwardly and then horizontally and terminates below the axle 13 and the lower rod 34 in the position of Figure 2, so as to engage this rod. Engagement of the rod 34 by the portion 80 prevents any accidental upward movement of the thresher part 16 from causing disengagement of the rollers 78 from the lifting portions 69 of the lifting members 68. It should be noted that in this function the rods 34 and associated parts, as a substitute for the mounting sleeve or tube disclosed and claimed in the aforementioned Hitchcock et al. application, presents a definite advantage. The rods 34 are made thick enough so as to resist bending caused by any upward movement of the thresher part 16. For a given weight of lifting structure 27, the rods can be made much greater in diameter than the thickness of a mounting sleeve. Thus, for a certain weight of lifting structure, the mounting sleeve may be thin enough not to resist bending, but, for the same weight of lifting structure, the rods 34 may be made much thicker and will thus resist bending. After the harvester thresher 15 has been raised to the mounted position of Figure 1, the upper half 52 of the ring-like structure 36 is, of course, moved from the position of Figure 5 to that of Figure 6, in which the groove 57 formed therein engages the flange 30 on the axle housing 29 so as to resist angular movement of the lifting structure 27 with respect to the axle 13, and thus to prevent shifting of the harvester thresher 15 away from the mounted position of Figure 1.

The lifting structure 27 of the present application is easier to attach and to detach than the corresponding lifting structure involving a sleeve disclosed in the Hitchcock et al. application. When the lifting structure 27 is to be detached from the tractor axle 13, the harvester thresher 15 will, of course, have been returned to the detached self-supporting position of Figure 1. The upper half 52 of the ring-like structure 36 will be in the disengaged position of Figure 5. For detachment of the lifting structure 27, it is then necessary only to loosen the bolt 43 and the nut 44 to swing open the upper half 38 of the ring-like structure 35 and to loosen the bolt 65 and nut 67 to swing open the upper half 53.

Another advantage of the lifting structure 27 over the corresponding structure of the Hitchcock et al. application is that the lifting members 68 are more easily adjusted along the rods 34 to adapt the lifting structure to the mounting of devices of different widths. For shifting of the lifting members 68 along the rods 34, it is only necessary to disengage the plunger 71 from the recesses 72 in the one rod 34 and to reinsert the plunger 71 in new recesses 72.

It will be apparent from the foregoing description that there has been provided a new and novel lifting structure for lifting an implement to mounted position upon a mobile supporting frame, such as a tractor.

The term "rods" has been used to describe the parts 34 in the specification, and the same term has been used in the claims. However, it is to be understood that this term in the claims is not to be limited to a solid round member as illustrated in the drawings but may cover a member other than round and other than solid.

The intention is to limit the invention only within the scope of the appended claims.

What is claimed is:

1. In combination, a tractor having a power plant and an axle, and implement-lifting means actuated by the tractor power plant and being mounted on the axle for angular movement thereabout, said implement-lifting means comprising a pair of rods spaced from one another about the axle, a first ring means about the axle supporting the rods at a certain point in their length so as to maintain them on opposite sides of the axle, a second ring means about the axle spaced from the first ring means and supporting the rods at another point on their length, and lifting members positioned in spaced relation to one another between the ring means, each lifting member being carried on the rods and having an implement-engaging portion.

2. In combination, a tractor having a power plant and an axle, and implement-lifting means actuated by the power plant and being mounted on the axle for angular movement thereabout, the implement-lifting means comprising a pair of rods parallel to the axle and spaced from one another, means supporting the rods at spaced points in their length and mounting them on the axle against movement toward and away from the axle and one another and for angular movement about the axle, and a lifting member having an implement-engaging portion and being supported on the rods so as to be angularly movable therewith about the axle.

3. In combination, a tractor having a power plant and an axle, and implement-lifting means actuated by the power plant and being mounted on the axle for angular movement thereabout, the implement-lifting means comprising a pair of rods parallel to the axle and spaced from one another, means supporting the rods at spaced points in their length and mounting them on the axle against movement toward and away from the axle and one another and for angular movement about the axle, and lifting members spaced from one another along the length of the rods, each lifting member having an implement-engaging portion and being supported on the rods so as to be angularly movable therewith about the axle.

4. In combination, a tractor having a power plant and an axle, and implement-lifting means actuated by the power plant and being mounted on the axle for angular movement thereabout, the implement-lifting means comprising a pair of rods parallel to the axle and spaced from one another in diametrically opposed relation on opposite sides of the axle, means supporting the rods at spaced points in their length and mounting them on the axle against movement toward and away from the axle and one another and for angular movement about the axle, and a lifting member having an implement-engaging portion and being supported on the rods so as to be angularly movable therewith about the axle.

5. In combination, a tractor having a power plant and an axle and implement-lifting means actuated by the power plant and being mounted on the axle for angular movement thereabout, the implement-lifting means comprising a pair of rods parallel to the axle and spaced from one another in diametrically opposed relation on opposite sides of the axle, means supporting the rods at spaced points in their length and mounting them on the axle against movement toward and away from the axle and one another and for angular movement about the axle, and lifting members spaced from one another along the length of the rods, each lifting member having an implement-engaging portion and being supported on the rods so as to be angularly movable therewith about the axle.

6. In combination, a tractor having a power plant and an axle, and implement-lifting means actuated by the power plant and being mounted on the axle for angular movement thereabout, the implement-lifting means comprising a pair of rods parallel to the axle and spaced from one another, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a lifting member having an implement-engaging portion and being supported on the rods so as to be angularly movable therewith about the axle and extending between the rods around only one side of the axle.

7. In combination, a tractor having a power plant and an axle, and implement-lifting means actuated by the power plant and being mounted on the axle for angular movement thereabout, the implement-lifting means comprising a pair of rods parallel to the axle and spaced from one another, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, a pair of lifting members spaced from one another, each lifting member having an implement-engaging portion and being supported on the rods so as to be angularly movable therewith about the axle and extending between the rods around only one side of the axle.

8. In combination, a tractor having a power plant and an axle, and implement-lifting means actuated by the power plant and being mounted on the axle for angular movement thereabout, the implement-lifting means comprising a pair of rods parallel to the axle and spaced from one another in diametrically opposed relation on opposite sides of the axle, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a lifting member having an implement-engaging portion and being supported on the rods so as to be angularly movable therewith about the axle and extending between the rods around only one side of the axle.

9. In combination, a tractor having a power plant and an axle, and implement-lifting means actuated by the power plant and being mounted on the axle for angular movement thereabout, the implement-lifting means comprising a pair of rods parallel to the axle and spaced from one another in diametrically opposed relation on opposite sides of the axle, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a pair of lifting members spaced from one another, each lifting member having an implement-engaging portion and being supported on the rods so as to be angularly movable therewith about the axle and extending between the rods around only one side of the axle.

10. In combination, a mobile supporting frame having an axle, and implement-lifting means mounted on the axle for angular movement thereabout and comprising a pair of rods spaced from one another about the axle, a first ring means about the axle supporting the rods at a certain point in their length so as to maintain them on opposite sides of the axle, a second ring means about the axle spaced from the first ring means and supporting the rods at another point on their length, and lifting members positioned in spaced relation to one another between the ring means, each lifting member being carried on the rods and having an implement-engaging portion.

11. In combination, a mobile supporting frame having an axle, and implement-lifting means mounted on the axle for angular movement thereabout and comprising a pair of rods parallel to the axle and spaced from one another, means supporting the rods at spaced points in their length and mounting them on the axle against movement toward and away from the axle and one another and for angular movement about the axle, and a lifting member having an implement-engaging portion and being supported on the rods so as to be angularly movable therewith about the axle.

12. In combination, a mobile supporting frame having an axle, and implement-lifting means mounted on the axle for angular movement thereabout and comprising a pair of rods parallel to the axle and spaced from one another, means supporting the rods at spaced points in their length and mounting them on the axle against movement toward and away from the axle and one another and for angular movement about the axle, a lifting member having an implement-engaging portion and being supported on the rods so as to be angularly movable therewith about the axle, and lifting members spaced from one another along the length of the rods, each lifting member having an implement-engaging portion and being supported on the rods so as to be angularly movable therewith about the axle.

13. In combination, a mobile supporting frame having an axle, and implement-lifting means mounted on the axle for angular movement thereabout and comprising a pair of rods parallel to the axle and spaced from one another in diametrically opposed relation on opposite sides of the axle, means supporting the rods at spaced points in their length and mounting them on the axle against movement toward and away from the axle and one another and for angular movement about the axle, and a lifting member having an implement-engaging portion and being supported on the rods so as to be angularly movable therewith about the axle.

14. In combination, a mobile supporting frame having an axle, and implement-lifting means mounted on the axle for angular movement thereabout and comprising a pair of rods parallel to the axle and spaced from one another in diametrically opposed relation on opposite sides of the axle, means supporting the rods at spaced points in their length and mounting them on the axle against movement toward and away from the axle and one another and for angular movement about the axle, and lifting members spaced from one another along the length of the rods, each lifting member having an implement-engaging portion and being supported on the rods so as to be angularly movable therewith about the axle.

15. In combination, a mobile supporting frame having an axle, and implement-lifting means mounted on the axle for angular movement thereabout and comprising a pair of rods parallel to the axle and spaced from one another, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a lifting member having an implement-engaging portion and being supported on the rods so as to be angularly movable therewith about the axle and extending between the rods around only one side of the axle.

16. In combination, a mobile supporting frame having an axle, and implement-lifting means mounted on the axle for angular movement thereabout and comprising a pair of rods parallel to the axle and spaced from one another, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a pair of lifting members spaced from one another, each lifting member having an implement-engaging portion and being supported on the rods so as to be angularly movable therewith about the axle and extending between the rods around only one side of the axle.

17. In combination, a mobile supporting frame having an axle, and implement-lifting means mounted on the axle for angular movement thereabout and comprising a pair of rods parallel to the axle and spaced from one another in diametrically opposed relation on opposite sides of the axle, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a lifting member having an implement-engaging portion and being supported on the rods so as to be angularly movable therewith about the axle and extending between the rods around only one side of the axle.

18. In combination, a mobile supporting frame having an axle, and implement-lifting means mounted on the axle for angular movement thereabout and comprising a pair of rods parallel to the axle and spaced from one another in diametrically opposed relation on opposite sides of the axle, a first ring-like structure surrounding the axle and supporting the rods at one end against movement toward and away from the axle and one another and for angular movement about the axle, a second ring-like structure surrounding the axle and supporting the rods at the other end against movement toward and away from the axle and one another and for angular movement about the axle, and a pair of lifting members spaced from one another, each lifting member having an implement-engaging portion and being supported on the rods so as to be angularly movable therewith about the axle and extending between the rods around only one side of the axle.

19. In combination, a tractor having an axle, and implement-lifting means mounted on the axle for angular movement thereabout and comprising a pair of rods spaced from one another about the axle, a first ring-like structure supporting the rod at one end and embracing the axle and being formed of disconnectible parts for easy attachment and detachment to and from the axle, a second ring-like structure supporting the rods at the other end and embracing the axle and being formed of disconnectible parts for easy attachment and detachment to and from the axle, and a lifting member having an implement-engaging portion and being supported on the rods.

20. In combination, a tractor having an axle, and implement-lifting means mounted on the axle for angular movement thereabout and comprising a pair of rods spaced from one another about the axle in diametrically opposed relation with respect to the axle, a first ring-like structure supporting the rods at one end and embracing the axle and being formed of disconnectible parts for easy attachment and detachment to and from the axle, a second ring-like structure supporting the rods at the other end and embracing the axle and being formed of disconnectible parts for easy attachment and detachment to and from the axle, and a lifting member having an implement-engaging portion and being supported on the rods.

21. In combination, a tractor having an axle, and implement-lifting means mounted on the axle for angular movement thereabout and comprising a pair of rods spaced from one another about the axle, a first ring-like structure supporting the rods at one end and embracing the axle and being formed of disconnectible parts for easy attachment and detachment to and from the axle, a second ring-like structure supporting the rods at the other end and embracing the axle and being formed of disconnectible parts for easy attachment and detachment to and from the axle, and a pair of lifting members spaced from one another along the length of the rods, each lifting member having an implement-engaging portion and being supported on the rods.

22. In combination, a tractor having an axle, and implement-lifting means mounted on the axle for angular movement thereabout and comprising a pair of rods spaced from one another about the axle in diametrically opposed relation with respect to the axle, a first ring-like structure supporting the rods at one end and embracing the axle and being formed of disconnectible parts for easy attachment and detachment to and from the axle, a second ring-like structure supporting the rods at the other end and embracing the axle and being formed of disconnectible parts for easy attachment and detachment to and from the axle, and a pair of lifting members spaced from one another along the length of the rods, each lifting member having an implement-engaging portion and being supported on the rods.

23. In combination, a tractor having an axle, and implement-lifting means mounted on the axle for angular movement thereabout and comprising a pair of rods spaced from one another about the axle, a pair of ring-like structures supporting the rods at their ends and embracing the axle, one ring-like structure being formed of disconnectible halves, one half being pierced by the rods, the other half being unpierced by the rods, and lifting members spaced from one another along the length of the rods, each lifting member having an implement-engaging portion and being pierced by the rods.

24. In combination, a tractor having an axle, and implement-lifting means mounted on the axle for angular movement thereabout and comprising a pair of rods spaced from one another about the axle, a pair of ring-like structures supporting the rods at their ends and embracing the axle, one ring-like structure being formed of disconnectible halves, each half being pierced by the rods, the other half being unpierced by the rods, and lifting members spaced from one another along the length of the rods, each lifting member having an implement-engaging portion and being pierced by the rods.

25. In combination, a tractor having an axle, and implement-lifting means mounted on the axle for angular movement thereabout and comprising a pair of rods spaced from one another about the axle, a pair of ring-like structures supporting the rods at their ends and embracing the axle, one ring-like structure being formed of disconnectible halves, of which one-half is pierced by the rods and the other half is unpierced by the rods, the other ring-like structure being formed of a first part pierced by the rods, a second part unpierced by the rods and connected with the first part and engageable with the tractor axle to prevent angular movement of the implement-lifting means thereabout, and a third part pierced by the rods and cooperating with the first part to prevent movement of the said other ring-like structure along the axle, and a pair of lifting members spaced from one another along the length of the rods, each lifting member having an implement-engaging portion and being pierced by the rods.

26. In combination, a tractor having an axle, and having a live exposed portion, and implement-lifting means mounted on the axle for angular movement thereabout and comprising a pair of rods spaced from one another about the axle, an antifriction bearing surrounding the live exposed portion of the axle, a pair of ring-like structures supporting the rods at their ends and embracing the antifriction bearing, one ring-like structure being formed of disconnectible halves, of which one half is pierced by the rods and the other half is unpierced by the rods, the other ring-like structure being formed of a first part pierced by the rods, a second part unpierced by the rods and connected with the tractor axle to prevent angular movement of the implement-lifting means thereabout, and a third part pierced by the rods and cooperating with the first part to prevent movement of the said other ring-like structure along the axle, and a pair of lifting members spaced from one another along the length of the rods, each lifting member having an implement-engaging portion and being pierced by the rods.

27. In combination, a tractor having an axle, and implement-lifting means mounted on the axle and comprising a pair of rods positioned on opposite sides of the axle, one rod having a plurality of recesses spaced along its length, means mounted on the axle for supporting the rods and maintaining them spaced from one another, a lifting member mounted on the rods and being movable lengthwise of the rods, and a retractible plunger mounted on the lifting member for insertion in any of the recesses in the one rod to fix the lifting member against movement lengthwise of the rods.

28. In combination, a tractor having an axle, and implement-lifting means mounted on the axle and comprising a pair of rods positioned on opposite sides of the axle, one rod having a plurality of recesses spaced along its length, means mounted on the axle for supporting the rods and maintaining them spaced from one another, a pair of lifting members mounted on the rods for movement lengthwise thereof, retractible plungers in the lifting members for insertion in any of the recesses in the one rod to fix the lifting members against movement along the rods and the spacing between the lifting members.

29. In combination, a tractor having an axle, and lifting means mounted on the axle and including a pair of rods positioned on opposite sides of the axle and a lifting member mounted on the rods, an implement having a first portion engageable with the lifting member and a second portion engageable with one rod, and means for actuating the lifting means to shift the rods and lifting member about the axle to raise the implement from ground-engaging position to a raised mounted position in which the first portion of the implement engages the lifting member over the tractor axle and the second portion of the implement engages the one rod beneath the axle to prevent disengagement of the first portion from the lifting member.

30. In combination, a mobile supporting frame having a transversely disposed member, and implement-lifting means mounted on the member for angular movement thereabout and comprising a pair of rods spaced from one another about the member, means mounting the rods on the member, and a lifting element carried on the rods and having an implement-engaging portion.

31. In combination, a tractor having an axle, and implement-lifting means mounted on the axle for angular movement thereabout and comprising a pair of rods spaced from one another about the axle, means mounting the rods on the axle, lifting members carried on the rods and having implement-engaging portions, and means for adjusting the position of the lifting members on the rods.

ARNOLD E. W. JOHNSON.
REX B. HITCHCOCK.